(12) United States Patent
Yoshinaga et al.

(10) Patent No.: US 8,025,138 B2
(45) Date of Patent: Sep. 27, 2011

(54) MULTI-PLATE CLUTCH SYSTEM

(75) Inventors: Kei Yoshinaga, Saitama (JP); Isamu Takahashi, Saitama (JP); Toshiharu Akutsu, Saitama (JP); Kazumitsu Yamamoto, Saitama (JP); Yoshiki Nagahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1015 days.

(21) Appl. No.: 11/974,818

(22) Filed: Oct. 16, 2007

(65) Prior Publication Data

US 2008/0099298 A1   May 1, 2008

(30) Foreign Application Priority Data

Oct. 25, 2006   (JP) .................................. 2006-290066

(51) Int. Cl.
*F16D 43/20* (2006.01)
*F16D 13/70* (2006.01)

(52) U.S. Cl. .................................. 192/54.5; 192/70.23

(58) Field of Classification Search ................ 192/54.5, 192/56.6, 70.23
See application file for complete search history.

(56) References Cited

U.S. PATENT DOCUMENTS

| 7,370,743 | B2 | 5/2008 | Kataoka et al. |
| 7,721,862 | B2 * | 5/2010 | Kataoka et al. ............ 192/54.5 |

FOREIGN PATENT DOCUMENTS

| JP | 57-202025 U | 12/1982 |
| JP | 2005-308092 | 11/2005 |
| JP | 2005-325993 | 11/2005 |
| JP | 2006-132744 A | 5/2006 |

* cited by examiner

*Primary Examiner* — David D Le
*Assistant Examiner* — Ryan Dodd
(74) *Attorney, Agent, or Firm* — Carrier Blackman & Associates, P.C.; William D. Blackman; Joseph P. Carrier (57) ABSTRACT

A multi-plate clutch system includes an outer clutch member having a plurality of first clutch plates thereon, a central spool having a plurality of second clutch plates thereon interspaced with the first clutch plates. The clutch system also includes a cam mechanism including a protruding cam and a recessed cam. The protruding cam and the recessed cam respectively include first inclined faces and second inclined faces, which are inclined in the same direction with respect to the circumferential direction. The protruding cam is thus brought into a point contact with the recessed cam during clutch engagement. As such, the multi-plate clutch system can maintain constant variable characteristics of the clutch capacity even when there is a variation in processing accuracy at the time of the production.

20 Claims, 5 Drawing Sheets

MULTI-PLATE CLUTCH SYSTEM

CROSS-REFERENCE TO RELATED APPLICATIONS

The present invention claims priority under 35 USC §119 based on Japanese patent application No. 2006-290066, filed on Oct. 25, 2006. The subject matter of this priority document is incorporated by reference herein.

BACKGROUND OF THE INVENTION

1. Technical Field of the Invention

The present invention relates to a multi-plate clutch system that transmits or discontinues the transmission of the drive power from an input member. More particularly, the present invention relates to a multi-plate clutch system equipped with a cam mechanism that suppresses reverse drive power coming from the output member from acting on the input-member side.

2. Background Art

A number of clutch systems including multiple plates are known. One example of a known multi-plate clutch system, described in Japanese Laid-Open Patent Application 2005-325993, has a protruding cam and a recessed cam formed respectively in a pressure plate and in an outer clutch member. Each of the cams has a contact face inclined towards the rotational direction. In the multi-plate clutch system, the clutch capacity is increased or decreased by the torque fluctuations caused by drive power from the crankshaft and reverse drive power from the wheel side.

In the multi-plate clutch system disclosed in Japanese Laid-Open Patent Application 2005-325993, the cam faces of the protruding cam and the recessed cam, each of which is formed in a plane shape, are brought into face contact with each other. By use of the inclined angle, and variation in rotation between an output-shaft side and an input-shaft side, the clutch plates are pressure-contacted with each other or moved away from each other to make the clutch capacity variable. However, in a case where a plurality of cam faces are formed in the circumferential direction, variation in processing accuracy causes changes of the point and in the area of the contact between cams. For the purpose of maintaining the variable characteristics constant, a machining center with a high processing accuracy and a production management system with a rigidly set post-processing management standard are required. As a result, it is difficult to reduce the manufacturing cost and to improve the productivity. In addition, the configuration depends mainly on face contacts, so that the friction contributes heavily to the operation of the cams. Accordingly, when ideal operational characteristics are set, in addition to the setting of the cam angles, friction under various conditions has to be taken into consideration.

The present invention is made in light of the difficulties with the prior art. One object of the present invention is to provide a multi-plate clutch system that maintains constant variable characteristics of the clutch capacity, even when there is a variation in processing accuracy at the time of the production. In addition, the multi-plate clutch system hereof can be produced with a lower production cost and with higher productivity.

SUMMARY OF THE INVENTION

To accomplish the above-mentioned object, according to a first aspect of the present invention, a multi-plate clutch system is provided, which includes: an outer clutch member joined to an input member; and a backing plate fixed to an output member. Also included are a plurality of first clutch plates engaged with the outer clutch member so as not to rotate relative to the outer clutch member, and a plurality of second clutch plates arranged alternately with the first clutch plates in the axial direction. The multi-plate clutch system also includes a central spool with which the second clutch plates are engaged so as to not rotate relatively to the central spool, and a pressure plate that holds, in the axial direction, the first clutch plates and the second clutch plates in the interstice formed between the pressure plate and the backing plate. In addition, the multi-plate clutch system includes a clutch spring that biases the pressure plate to a side so such that the first clutch plates and the second clutch plates are in contact with each other. Moreover, the multi-plate clutch system includes a cam mechanism that is provided between the backing plate and the central spool. The cam mechanism transmits the drive power of the input member from the central spool to the backing plate. The cam mechanism pushes the pressure plate, with a central spool interposed in between, to a side such that the pressure plate is moved away from the backing plate against the biasing force of the clutch spring when reverse drive power is applied by the output member. The cam mechanism, furthermore, includes a protruding cam and a recessed cam. Each of the protruding cam and the recessed cam has a first inclined face and a second inclined face, which are inclined in the same direction with respect to the circumferential direction. The protruding cam is brought into point contact with the recessed cam.

In a second aspect of the present invention, a multi-plate clutch system is provided with following characteristics in addition to the configuration of the first aspect of the present invention. At least one of the first and the second inclined faces of the protruding cam is formed with a curved surface in the axial direction. At least one of the first and the second inclined faces of the recessed cam is formed with a curved surface in the radial direction.

In a third aspect of the present invention, a multi-plate clutch system is provided with the following characteristics in addition to the configuration of the second aspect of the present invention. The protruding cam and the recessed cam are formed as projections. The curvature of the curved surface of each of the protruding cam and the recessed cam is approximately ten times as large as the width of the corresponding surface of the protruding cam and of the recessed cam.

In a fourth aspect of the present invention, a multi-plate clutch system is provided with the following characteristics in addition to the configuration of the third aspect of the present invention. A plurality of the recessed cams are formed. At least an end side, in the radial direction, of each of the recessed cams is made to be opened.

In a fifth aspect of the present invention, a multi-plate clutch system is provided with the following characteristics in addition to any one of the configurations of the first and the second aspects of the present invention. Inclined faces on a side of the first and the second inclined faces are brought into a point contact with each other, for increasing the clutch capacity.

According to the multi-plate clutch system of the first aspect of the present invention, the cam mechanism includes the protruding cam and the recessed cam. Each of the protruding cam and the recessed cam has the first inclined face and the second inclined face, which are inclined in the same direction with respect to the circumferential direction. The protruding cam is brought into a point contact with the recessed cam. Consequently, even when there is a variation in processing accuracy between the protruding cam and the recessed cam, the contact area between the protruding cam and the recessed cam is prevented from changing. As a result, while the system maintains constant variable characteristics of the clutch capacity, the manufacturing cost of the system can be lowered and an improvement in productivity can be achieved.

According to the multi-plate clutch system of the second aspect of the present invention, at least one of the first and the second inclined faces of the protruding cam is formed into a convex surface which is curved in the axial direction. At least one of the first and the second inclined faces of the recessed cam is formed into a convex surface which is curved in the radial direction. Consequently, a point contact is accomplished when the convex curved surface of each of the first and the second inclined faces of the protruding cam is arranged in a direction orthogonal to the convex curved surface of the corresponding one of the first and the second inclined faces. As a result, an improvement in machinability and in productivity is accomplished in comparison to the case where the first and the second inclined faces are processed into spherical surfaces. As used herein, the term "convex" means curved outwardly at a medial portion thereof as viewed in at least one cross-sectional view thereof, such as the cam surfaces described and shown herein.

According to the multi-plate clutch system of the third aspect of the present invention, the protruding cam and the recessed cam are formed as projections. The curvature of the curved surface of each of the protruding cam and the recessed cam is approximately ten times as large as the width of the corresponding surface of the protruding cam and of the recessed cam. Consequently, the wall thickness of the parts, except for the protruding cam and the recessed cam, can be made smaller. As a result, the system can be made lighter in weight.

According to the multi-plate clutch system of the fourth aspect of the present invention, the plurality of the recessed cams are formed. At least an end side, in the radial direction, of each of the recessed cams is made to be opened. Consequently, when the plurality of recessed cams are formed by machine processing, the plurality of recessed cams can be processed consecutively without lifting up the machining center after the first one of the recessed cams is formed. In this way, the processing speed is enhanced, and thus the productivity is improved.

According to the multi-plate clutch system of the fifth aspect of the present invention, among the first and the second inclined faces, the inclined faces on the side for increasing the clutch capacity are brought into a point contact with each other. Consequently, the inclined faces on the side for decreasing the clutch capacity do not have to be formed by machine processing. As a result, the system can be manufactured at a reduced cost.

BRIEF DESCRIPTION OF THE DRAWINGS

FIG. 4(*a*) is a vertical cross-sectional view of a backing plate according to a first embodiment of the present invention.

FIG. 4(*b*) is a cross-sectional view showing a cam member in FIG. 4(*a*) viewed along the arrow G.

DETAILED DESCRIPTION

A selected illustrative embodiment of the invention will now be described in some detail, with reference to the drawings. Note that, in the following, the drawings are viewed in the same direction as numerals. It should be understood that only structures considered necessary for clarifying the present invention are described herein. Other conventional structures, and those of ancillary and auxiliary components of the system, are assumed to be known and understood by those skilled in the art.

Figure 1:
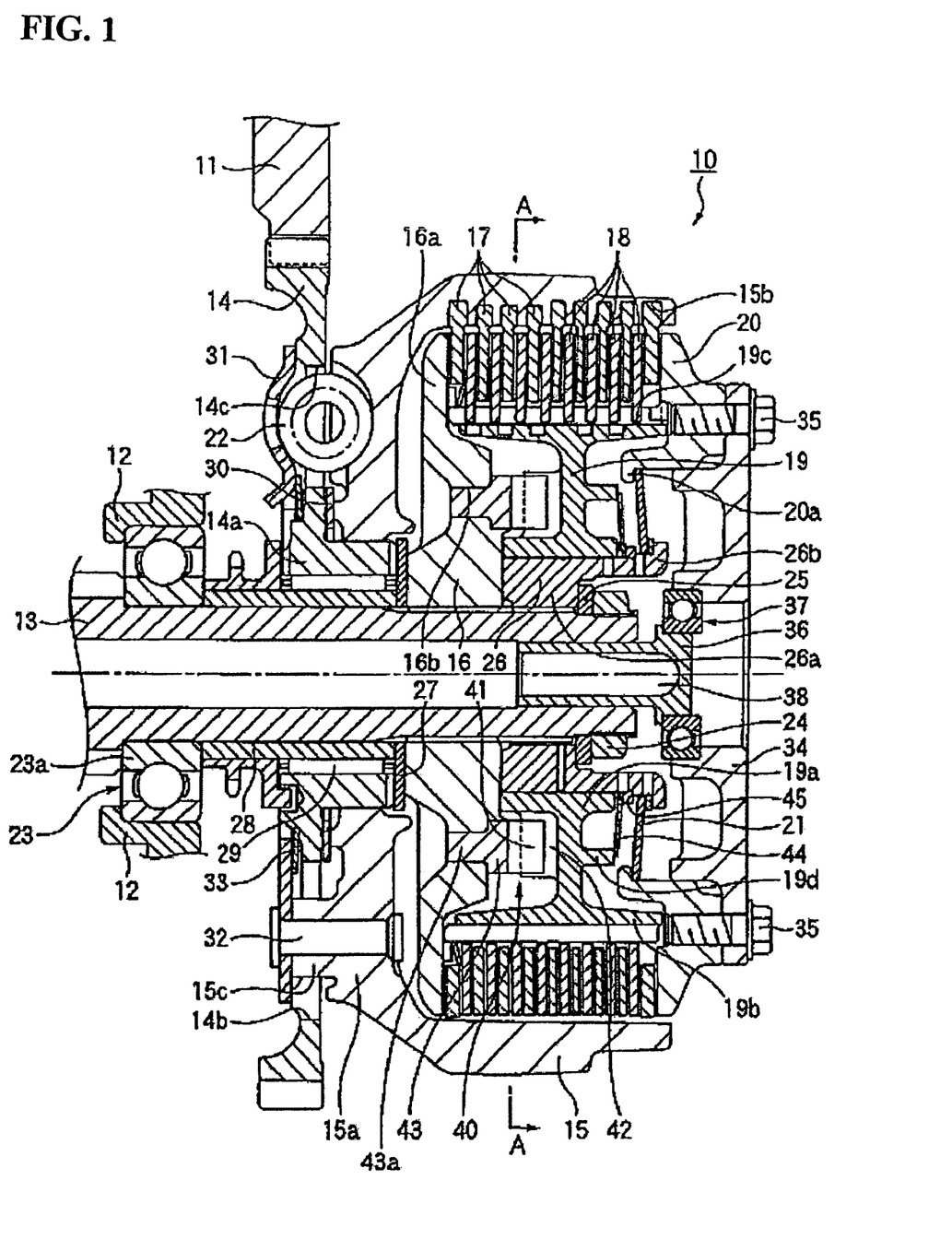
FIG. 1 is a partially-cutout cross-sectional view of a multi-plate clutch system according to a first embodiment of the present invention.

FIG. 1 is a partially-cutout cross-sectional view of a multi-plate clutch system according to a first illustrative embodiment of the present invention. According to the first embodiment of the present invention, as shown in FIG. 1, drive power from a crankshaft (not shown) is transmitted to a main shaft 13, via a drive gear 11, driven gear 14, and a multi-plate clutch system 10. The drive gear 11 is provided on the crankshaft (not shown). The driven gear 14, which meshes with the drive gear 11, is rotatably supported by the main shaft 13 of the transmission, while the main shaft 13 is rotatably supported by a crankcase 12.

Power from the drive gear 11 comes into the clutch system 10 via the driven gear 14, which is an input member, and is transmitted through the clutch system to the main shaft 13, which is an output member. The multi-plate clutch system 10 is provided to smooth the transmission of drive torque from the driven gear 14 to the main shaft 13.

As shown in FIG. 1, the multi-plate clutch system 10, according to the first embodiment, includes a substantially bowl-shaped outer clutch member 15, which is joined to the driven gear 14 via rivets 32. The multi-plate clutch system 10 also includes a backing plate 16 fixed to the main shaft 13. The multi-plate clutch system 10 further includes a plurality of first clutch plates 17, and a plurality of second clutch plates 18, which alternate with the first clutch plates 17 in the axial direction. In addition, the multi-plate clutch system 10 includes a central spool 19, a pressure plate 20, a clutch spring 21, and a cam mechanism 40.

The first clutch plates 17 are engaged with the outer clutch member 15 for concurrent movement therewith, and are not allowed to rotate relative to the outer clutch member 15. The second clutch plates 18 are engaged with the central spool 19 for concurrent movement therewith, and the second clutch plates 18 cannot rotate relative to the central spool 19. The first clutch plates 17 and the second clutch plates 18 are held by and between the backing plate 16 and the pressure plate 20 in the axial direction. The clutch spring 21 biases the pressure plate 20 to a side such that the first and second clutch plates 17, 18 are in pressure-contact with each other. The cam mechanism 40 is provided between the backing plate 16 and the central spool 19.

A ball bearing 23 is set between the main shaft 13 and the crankcase 12, and has an inner race 23*a*. A nut 24 is screwed onto a first end of the main shaft 13. Starting at the nut 24, a first spacer 25, a boss 26*a* of a support tube 26, the inner peripheral portion of the backing plate 16, a second spacer 27, a sleeve 28, which has a cylindrical shape and coaxially surrounds the main shaft 13, are held, in that order, by and between the nut 24 and the inner race 23*a*.

The inner peripheral portion of the backing plate 16 and the boss 26*a* of the support tube 26 are splined to fit onto the main shaft 13. Accordingly, the backing plate 16 and the support tube 26 are coupled onto the main shaft 13 for concurrent movement therewith, and are not allowed to rotate relatively to the main shaft 13. A slight clearance is provided between the main shaft 13 and the support tube 26. In addition, a central boss portion 14a of the driven gear 14 is rotatably supported on the main shaft 13 via a needle bearing 29 provided intermediate the driven gear and the sleeve 28.

The outer clutch member 15, which may be made of aluminum or similar material, is formed into a cylinder, the base of which is an end wall 15a provided at the driven-gear 14 side. A ring-shaped slide plate 30 is set between the end wall 15a and the driven gear 14. In addition, engagement grooves 15b are formed in the inner circumferential surface of the outer clutch member 15 substantially at regular intervals in the axial direction. The plurality of first clutch plates 17 are engaged with the outer clutch member 15 by use of these engagement grooves 15b.

Also at the end wall 15a of the outer clutch member, a plurality of joint bosses 15c protrude from the end wall 15a of the outer clutch member 15 at a plurality of positions in the circumferential direction. A plurality of long holes 14b are formed in the driven gear 14, with each long hole 14b stretching along the driven gear in a circumferential direction, and these long holes are arranged at intervals along the circumferential direction. The joint bosses 15c of the outer clutch member 15 are inserted into the respective long holes 14b.

In addition, a holding plate 31 is brought into contact with the end face of each of the joint bosses 15c of the outer clutch member 15. The holding plate 31 faces a side surface of the driven gear 14. The side surface of the driven gear 14 is located on the opposite side of the driven gear 14 from the end wall 15a. Rivets 32, which penetrate the respective joint bosses 15c, are used to fix the holding plate 31 to the joint bosses 15c of the outer clutch member 15. In addition, a dish spring 33 is provided between the holding plate 31 and the driven gear 14, so as to bias the driven gear 14 and the end wall 15a towards the respective surfaces of the slide plate 30.

A plurality of spring-holding holes 14c are formed in the driven gear 14, and are stretched along the circumferential direction of the driven gear 14. The spring-holding holes 14c are arranged at positions that are offset, in the circumferential direction, from the locations of the plurality of long holes 14b. Damper springs 22, which are set between the driven gear 14 and the outer clutch member 15, are accommodated in the respective spring-holding holes 14c.

The backing plate 16, which may be made of aluminum or a similar material, is formed generally in a ring shape, and is provided with a pressure-receiving portion 16a at the outer periphery thereof.

The central spool 19, which may be made of an SCM carburized steel or similar material, has an inner cylindrical portion 19a and an outer cylindrical portion 19b. The inner cylindrical portion 19a is slidably fitted onto the support tube 26. The outer cylindrical portion 19b is placed between the backing plate 16 and the pressure plate 20. A plurality of engagement grooves 19c are formed, at substantially regular intervals in the axial direction, in the outer circumferential surface of the central spool's outer cylindrical portion 19b. The plurality of second clutch plates 18 are engaged with the engagement grooves 19c of the central spool.

The pressure plate 20, which may be made of aluminum or similar material, is formed generally in a ring shape, so as to be engaged with the outer cylindrical portion 19b of the central spool 19 while prohibiting the relative rotation of the pressure plate 20 to the central spool 19. The clutch spring 21 is a diaphragm spring. The two ends of the clutch spring 21 are engaged with the interstice between brim portions 20a and 26b. The brim portion 20a is formed in the clutch-center side end portion of the inner periphery of the pressure plate 20. The brim portion 26b is formed in the pressure-plate side end portion of the support tube 26. With the biasing force of the clutch spring 21, the pressure plate 20 presses inwardly on the central spool 19, and as a result, the first and the second clutch plates 17, 18, which alternately disposed, are biased towards the pressure-receiving portion 16a of the backing plate 16. In other words, the multi-plate clutch system 10 is normally biased inwardly by the pressure of the clutch spring 21, such that the clutch is in an engaging state.

The outer peripheral portion of a lifter plate 34 is joined to the pressure plate 20 with a plurality of bolts 35. The inner peripheral portion of the lifter plate 34 is rotatably supported by a lifter tip 36 with a release bearing 37 placed in between. The cylindrical lifter tip 36 is slidably fitted in a hole formed in a first end portion of the cylindrical main shaft 13. Inside the main shaft 13, a lifter shaft 38 is inserted. An operation of a clutch operation member (not shown) moves the lifter shaft 38 forward or backward in the axial direction. The lifter tip 36 is contiguously joined to an end of the lifter shaft 38.

A rightward movement (as shown in FIG. 1) of the lifter shaft 38 moves the lifter plate 34 to one side so as to make the lifter plate 34 move away from the central spool 19 against the biasing force of the clutch spring 21. Accordingly, the frictional engagement between the first and the second clutch plates 17 and 18 is released. As a result, the clutch is disengaged, and the transmission of the drive power between the outer clutch member 15 and the main shaft 13 is temporarily interrupted.

The drive force from the driven gear 14 is transmitted by the cam mechanism 40 from the central spool 19 to the backing plate 16. When reverse drive power is applied from the main shaft 13, the cam mechanism 40 pushes the pressure plate 20 to a side, with the central spool 19 in-between, against the biasing force of the clutch spring 21, so as to make the pressure plate 20 move away from the backing plate 16.

Figure 2:
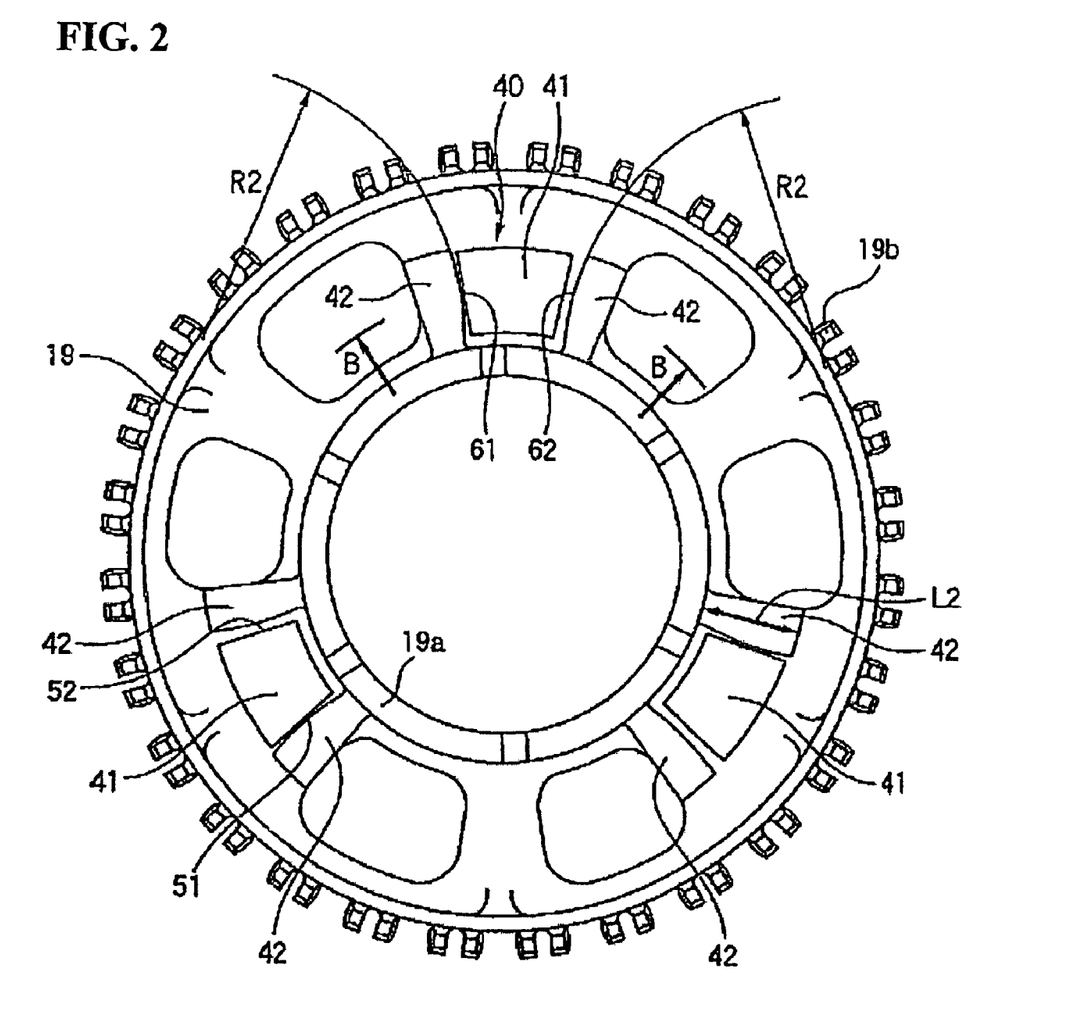
FIG. 2 is a cross-sectional view taken along the line A-A in FIG. 1 and viewed as the arrow indicates.
Figure 3:
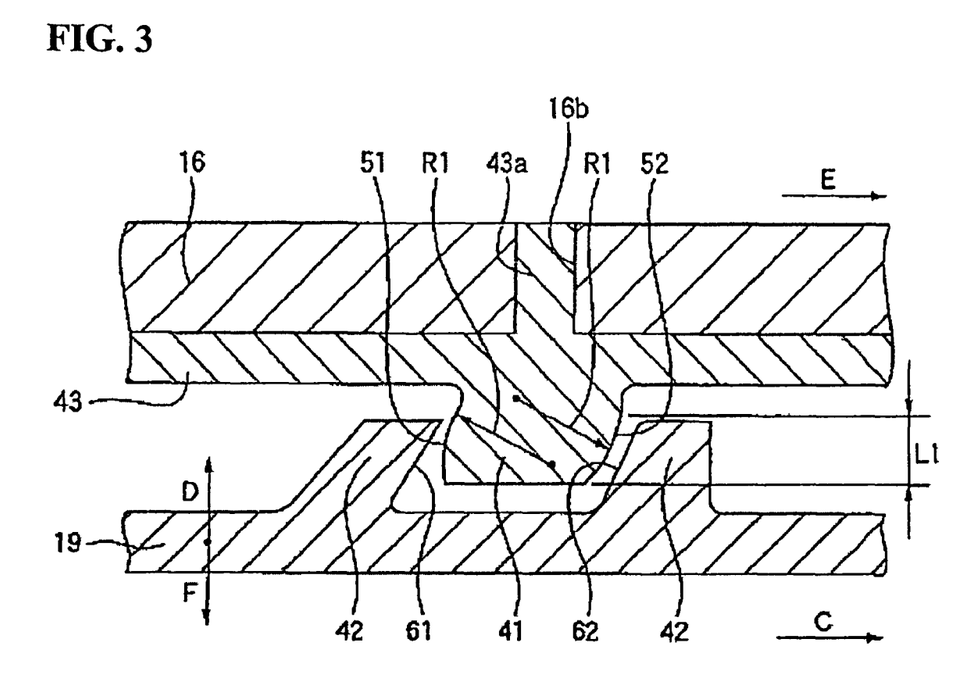
FIG. 3 is a cross-sectional view taken along the line B-B in FIG. 2 and viewed as the arrows indicate.

As shown in FIGS. 1 to 3, the cam mechanism 40 includes three protruding cams 41, three recessed cams 42, and a diaphragm spring 44. The protruding cams 41 extend outwardly from the backing plate 16, so as to protrude toward the central spool 19. The recessed cams 42 are formed in the central spool 19 so as to protrude toward the backing plate 16. Each protruding cam 41 is inserted into the corresponding one of the recessed cams 42. The diaphragm spring 44 biases the central spool 19 inwardly in the outer clutch member 15, so as to make the central spool 19 approach the backing plate 16. In the first embodiment, the protruding cams 41 are each formed integrally with a cam member 43, which is attached to the backing plate 16. The recessed cams 42 are formed integrally with the central spool 19.

Figure 4A:
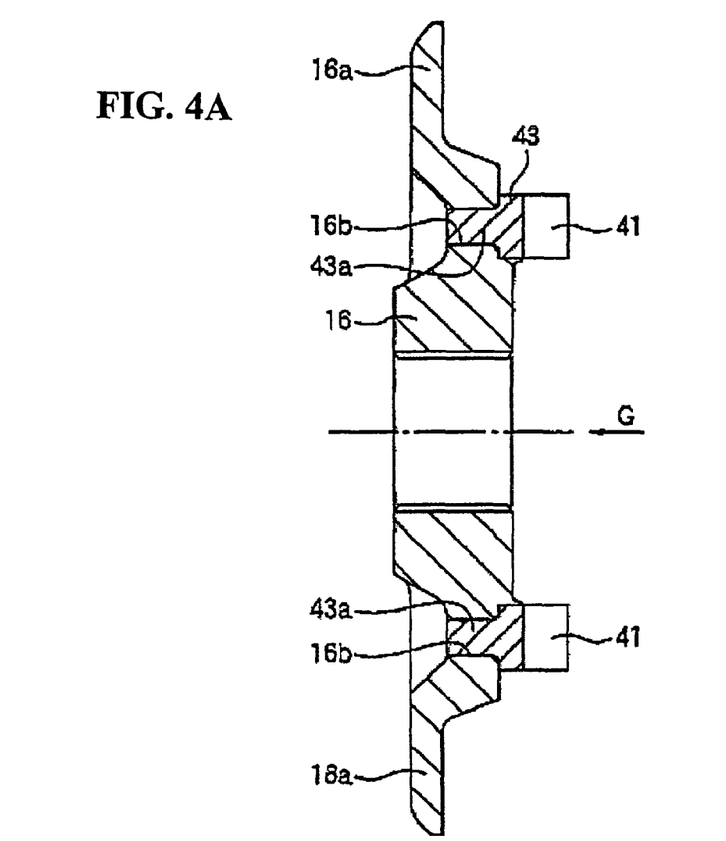
Figure 4B:
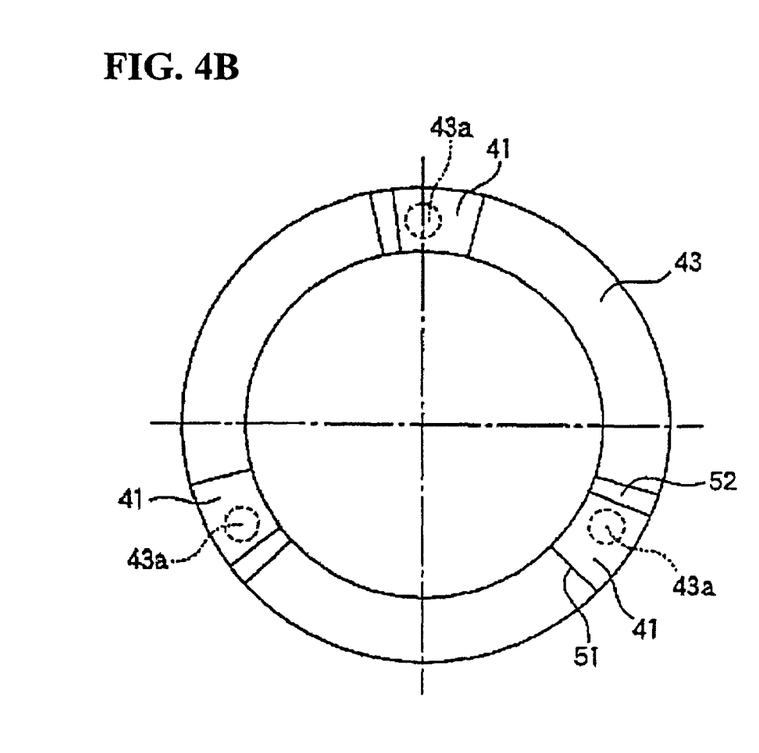

The cam member 43, which may be made of an SCM carburized steel or similar material, is formed into a ring shape as shown in FIG. 4. A plurality of fitting protruding portions 43a protrude from the cam member 43 at a plurality of positions along the circumferential direction. By press-fitting each filling protruding portion 43a into corresponding one of a plurality of fitting holes 16b, which are formed in the backing plate 16, the cam member 43 gets attached to the backing plate 16. In addition, the protruding cams 41 are formed, at regular intervals, in the clutch-center side surface of the cam member 43, which is to be attached to the backing plate 16.

Moreover, as shown in FIG. 3, in the outer end surface in the circumferential direction of each protruding cam 41, a first inclined face 51 and a second inclined face 52 are formed. The faces 51 and 52 are inclined in the same general direction with respect to the circumferential direction, although it will be seen from the drawing that each of the inclined faces 51, 52 is formed in an inclined convex shape as seen in cross-section. In one instance, the first inclined face 51 is engaged with the corresponding one of the recessed cams 42 so as to make the central spool 19 move towards the backing plate 16 side, and thus to increase the clutch capacity when the drive force from the driven gear 14 is applied.

In a second instance, the second inclined face 52 is brought into contact with the corresponding one of the recessed cams 42 when reverse drive power from the main shaft 13 is applied. In the second instance, the central spool 19 moves away from the backing plate 16, thereby decreasing the clutch capacity.

In addition, as shown in FIG. 3, the first and the second inclined faces 51 and 52 of each protruding cam 41 are formed with curved surfaces in the axial direction. The radius of curvature R1 of the curved surface of each of the first and the second inclined faces 51, 52 is set at approximately ten times as large as the width L1, in the axial direction, of each protruding cam 41. For example, if L1=5.6 mm, then R1=50 mm. Incidentally, the first and the second inclined faces 51, 52 of each protruding cam 41 are formed by a polygon turning in which a workpiece and a rotating tool are rotated in the same direction on respective axes that are parallel to each other. Thus, the rotating tool intermittently cuts the workpiece.

When the radius of curvature R1 of each of the first and the second inclined faces 51, 52 is smaller than approximately ten times as large as the width L1 of each of the protruding cams 41, the area at the root portion of each protruding cam 41 is excessively small. This results in an insufficient strength. In contrast, when the radius of curvature R1 of each of the first and the second inclined faces 51, 52 is larger than approximately ten times as large as the width L1 of each of the protruding cams 41, the contact point of one of the protruding cam 41, formed within the variation in machining accuracy, the corresponding recessed cam 42 is positioned significantly off the center of the cam face. As a result, fluctuations may occur in how the force is received.

Moreover, as shown in FIG. 3, in the inner end surface in the circumferential direction of each of the recessed cams 42, a first inclined face 61 and a second inclined face 62 are formed. The faces 61 and 62 are inclined to the same direction with respect to the circumferential direction. The first inclined face 61 is engaged with the first inclined face 51 of the corresponding one of the protruding cams 41 such that the central spool 19 moves towards the backing plate 16, thereby increasing the clutch capacity when the drive force from the driven gear 14 is applied. On the other hand, when reverse drive power from the main shaft 13 is applied, the second inclined face 62 is brought into contact with the second inclined face 52 of the corresponding one of the protruding cams 41. In this case, the central spool 19 moves to a side away from the backing plate 16, thereby decreasing the clutch capacity. Incidentally, the outer end side in the radial direction of each recessed cam 42 is opened. Although, as described above, each of the recessed cams 42 of the first embodiment has an open side formed on the outer end side in the radial direction, if desired, the open side may be formed on the inner end side in the radial direction, or may be formed on the sides of the two ends in the radial direction.

In addition, as shown in FIG. 2, the first and the second inclined faces 61 and 62 of each of the recessed cams 41 are formed with curved surfaces in the radial direction. The radius of curvature R2 of the curved surface of each of the first and the second inclined faces 61, 62 is set at approximately ten times as large as the width L2, in the radial direction, of the recessed cam 42. For example, if L2=14 mm, then R2=150 mm. Incidentally, the first and the second inclined faces 61, 62 of each recessed cam 42 are formed by NC machining in which the movements of a cutting tool, such as a drill, and of a workpiece are controlled and operated using their coordinate values. Thus, the cutting tool is made to cut the workpiece.

When the radius of curvature R2 of each of the first and the second inclined faces 61, 62 is smaller than approximately ten times as large as the width L2 of each of the recessed cams 42, the area at the root portion of each recessed cam 42 is excessively small. This results in an insufficient strength. In contrast, when the radius of curvature R2 of each of the first and the second inclined faces 61, 62 is approximately ten times larger than the width L2 of each of the recessed cams 42, the contact point of one of the recessed cams 42, formed within the variation in machining accuracy, with the corresponding protruding cam 41 positioned significantly off the center of the cam face. As a result, fluctuations may occur in how the force is received.

In addition, a medial cylindrical portion 19d is formed in the central spool 19 at a middle position between the inner cylindrical portion 19a and the outer cylindrical portion 19b so as to protrude to the side of the pressure plate 20. A first end of the diaphragm spring 44 is brought into contact with the outer end portion of this medial cylindrical portion 19d. A second end of the diaphragm spring 44 is engaged with a stopper ring 45 attached to the outer circumference of the support tube 26. The biasing force of the diaphragm spring 44 causes the central spool 19 to be pushed to the backing plate 16, i.e., to the left as seen in FIG. 1. As such, each of the protruding cams 41 is securely inserted into the corresponding one of the recessed cams 42.

In the multi-plate clutch system 10 with the above-described structure, when the drive power from the driven gear 14 makes the central spool 19 rotate in the direction as indicated by arrow C in FIG. 3, the first inclined face 51 of the protruding cam 41 is engaged with the first inclined face 61 of the recessed cam 42 with a point contact. Thus, the central spool 19 is moved to the side of the backing plate 16 in the direction as indicated by arrow D in FIG. 3. In this event, the frictional engaging force between the first clutch plates 17 and the second clutch plates 18 is increased. As a result, the drive power acting on the central spool 19 is efficiently transmitted to the backing plate 16.

In contrast, when the reverse drive power from the main shaft 13 makes the backing plate 16 rotate in the direction as indicated by arrow E in FIG. 3, the second inclined face 52 of the protruding cam 41 is brought into a point contact with the second inclined face 62 of the recessed cam 42. Thus, the central spool 19 is moved to the side away from the backing plate 16 in the direction as indicated by arrow F in FIG. 3. In this event, the frictional engaging force between the first clutch plates 17 and the second clutch plates 18 is decreased. As a result, the reverse drive power acting on the central spool 19 is effectively suppressed.

Moreover, according to the first embodiment hereof, when the first inclined face 51 of the protruding cam 41 is engaged with the first inclined face 61 of the recessed cam 42, the first inclined face 51 is brought into a point contact with the first inclined face 61. When the second inclined face 52 of the protruding cam 41 is brought into contact with the second inclined face 62 of the recessed cam 42, the second inclined face 52 is brought into a point contact with the second inclined face 62. Consequently, the system 10 maintains constant variable characteristics of the clutch capacity even when there is a variation in processing accuracy between the protruding cam 41 and the recessed cam 42. This is because, even with the variation in the processing accuracy, the contact area between the protruding cams 41 and the recessed cams 42 does not vary. In addition, variation in processing accuracy is permitted when the protruding cam 41 and the recessed cam 42 are subjected to machining. Consequently, neither machining center with a high processing accuracy nor production management system with a rigidly set post-machining management standard is necessary. As a result, the production cost of the system 10 can be lowered.

As has been described above, according to the multi-plate clutch system 10 of the first embodiment hereof, the cam mechanism 40 includes the protruding cams 41 and the recessed cams 42. The protruding cam 41 and the recessed cam 42 have the respective first inclined faces 51 and 61, both of which are inclined in the same direction with respect to the circumferential direction, and have the respective second inclined faces 52 and 62, both of which are inclined also in the same direction with respect to the circumferential direction. In addition, the protruding cam 41 is brought into a point contact with the recessed cam 42. Consequently, even when there is a variation in processing accuracy between the protruding cam 41 and the recessed cam 42, the contact area between the protruding cam 41 and the recessed cam 42 is prevented from changing. As a result, while the system 10 maintains constant variable characteristics of the clutch capacity, the manufacturing cost of the system 10 can be lowered and an improvement in productivity can be achieved.

In addition, according to the multi-plate clutch system 10 of the first embodiment hereof, each of the first and the second inclined faces 51 and 52 of the protruding cam 41 forms a curved surface in the axial direction while each of the first and the second inclined faces 61 and 62 of the recessed cam 42 forms a curved surface in the radial direction. Consequently, a point contact is accomplished when the curved surface of each of the first and the second inclined faces 51 and 52 of the protruding cams 41 is arranged in a direction orthogonal to the curved surface of the corresponding one of the first and the second inclined faces 61 and 62 of the recessed cam 42. As a result, an improvement in machinability and in productivity is accomplished in comparison to the case where the first and the second inclined faces 51, 52, 61, and 62 are processed into spherical surfaces.

Moreover, according to the multi-plate clutch system 10 of the first embodiment hereof, the protruding cams 41 and the recessed cams 42 are formed as projections, and the curved surface of each of the first and the second inclined faces 51, 52, 61, 62 of the protruding cams 41 and of the recessed cams 42 is made to have a curvature approximately ten times as large as the width of the corresponding one of the protruding cams 41 and the recessed cams 42. Consequently, the wall thickness of the cam member 43 (excluding the protruding cams 41) and the wall thickness of the central spool 19 (excluding the recessed cams 42) can be made smaller. As a result, the system 10 is made lighter in weight.

Further, according to the multi-plate clutch system 10 of the first embodiment hereof, the plurality of recessed cams 42 are formed, and the outer end side in the radial direction of each of the recessed cams 42 is made to open. Consequently, when the plurality of the recessed cams 42 are formed by machine processing, they can be processed consecutively without lifting up the machining center after the first one of the recessed cams 42 is formed. As such, the processing speed is enhanced, and thus the productivity is improved.

Furthermore, according to the multi-plate clutch system 10 of the first embodiment hereof, the protruding cams 41 of the cam member 43 are formed by a polygon turning. Consequently, the protruding cams 41 can easily be formed in the cam member 43, and thus the productivity is improved.

Figure 5:
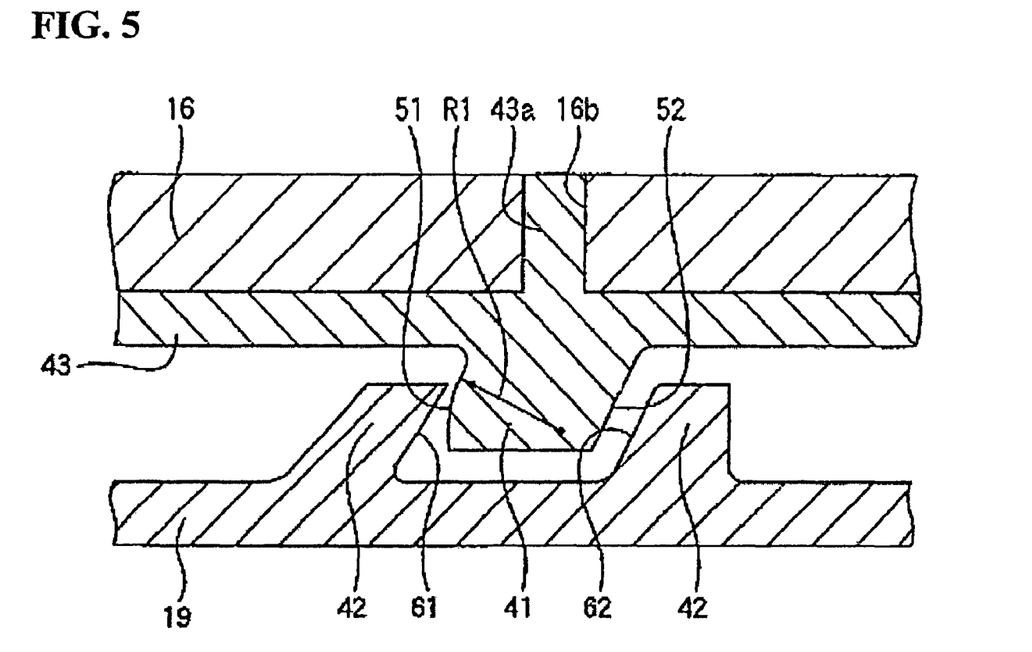
FIG. 5 is a partially-cutout cross-sectional view of a multi-plate clutch system according to a second embodiment of the present invention.

As shown in FIG. 5, a second embodiment hereof may be configured as follows. The first inclined faces 51 and 61 of the protruding cams 41 and of the recessed cams 42 (the inclined faces of the side for increasing the clutch capacity) are formed with curved surfaces. Thus, each of the protruding cams 41 is brought into a point contact with the corresponding one of the recessed cams 42. Meanwhile, the second inclined faces 52 and 62 of the protruding cams 41 and of the recessed cams 42 (the inclined faces of the side for decreasing the clutch capacity) are formed into flat surfaces. Thus, each of the protruding cams 41 is brought into face contact with the corresponding one of the recessed cams 42. In this case, the second inclined faces can be formed by forging. As such, the man-hour needed for the machine processing can be reduced. As a result, the system 10 can be manufactured at a lower cost. Note that, in the second embodiment hereof, both of the second inclined faces 52 and 62 of the protruding cams 41 and of the recessed cams 42 are formed into flat surfaces, but any one of the second inclined faces 52 and 62 may be formed into flat surfaces.

While a working examples of the present invention have been described above, the present invention is not limited to the working examples described above, but various design alterations may be carried out without departing from the present invention as set forth in the claims.

For example, in the above embodiments, each of the first and the second inclined faces 51 and 52 of the protruding cams 41 forms a curved surface in the axial direction while each of the first and the second inclined faces 61 and 62 of the recessed cams 42 forms a curved surface in the radial direction. The present invention is not limited to this structure. Instead, each of the first and the second inclined faces 51 and 52 of the protruding cams 41 may form a curved surface in the radial direction while each of the first and the second inclined faces 61 and 62 of the recessed cams 42 may form a curved surface in the axial direction.

In addition, in the above embodiments, the protruding cams 41 are formed in the backing plate 16 while the recessed cams 42 are formed in the central spool 19. The present invention is not limited to this structure. Instead, the recessed cams 42 may be formed in the backing plate 19 while the protruding cams 41 may be formed in the central spool 19.

Moreover, in the above embodiments, three of the protruding cams 41 are formed in the backing plate 16 while three of the recessed cams 42 are formed in the central spool 19. The respective numbers of the protruding cams 41 and of the recessed cams 42 are not limited to any particular number, and any number of the protruding cams 41 and of the recessed cams 42 can be formed.

What is claimed is:
1. A multi-plate clutch system comprising:
an outer clutch member which is operatively connected to an input member;
a backing plate, fixed to an output member via a spline connection therebetween;
a plurality of first clutch plates engaged with the outer clutch member so as not to rotate relative to the outer clutch member;
a plurality of second clutch plates arranged alternately with the first clutch plates in an axial direction;
a central spool which is formed separately from the backing plate, wherein the central spool has a first side oriented toward the backing plate and a second side oriented facing away from the backing plate and wherein the second clutch plates are engaged with the central spool so as not to rotate relative to the central spool;

a pressure plate disposed proximate the second side of the central spool and that holds, in the axial direction, the first clutch plates and the second clutch plates in the interstice formed between the pressure plate and the backing plate;

a clutch spring that biases the pressure plate to a side so as to pressure-contact the first clutch plates and the second clutch plates with each other; and a cam mechanism that is provided between the backing plate and the first side of the central spool, wherein the cam mechanism transmits the drive power of the input member from the central spool to the backing plate, and which pushes the pressure plate, with the central spool interposed in between, to a side so as to make the pressure plate move away from the backing plate against the biasing force of the clutch spring when reverse drive power is applied from the output member, wherein the cam mechanism includes a protruding cam and a recessed cam each having at least one convex surface, each of the protruding cam and the recessed cam has a first inclined face and a second inclined face, which are inclined in the same direction with respect to the circumferential direction, and the cams are respectively configured and arranged such that during clutch engagement, a convex surface of the protruding cam is brought into point contact with a convex surface of the recessed cam.

2. The multi-plate clutch system according to claim 1, wherein at least one of the first and the second inclined faces of the protruding cam is formed with a convex curved surface extending in the axial direction, and at least one of the first and the second inclined faces of the recessed cam is formed with a convex curved surface extending in a radial direction.

3. The multi-plate clutch system according to claim 2, wherein the protruding cam and the recessed cam are formed as projections, and wherein a radius of curvature of the curved surface of a selected one of the protruding cam or the recessed cam is approximately ten times as large as a width of the selected one of the protruding cam or the recessed cam.

4. The multi-plate clutch system according to claim 3, wherein:

a plurality of the recessed cams are formed between the backing plate and the central spool, each of the recessed cams comprising a pair of spaced-apart projections defining a recess therebetween, and at least an end side, in the radial direction, of each of the recessed cams is open in an area between said spaced-apart projections.

5. The multi-plate clutch system according claim 1, wherein, among the first and the second inclined faces, inclined faces on a side for increasing the clutch capacity are brought into point contact with each other.

6. The multi-plate clutch system according claim 2, wherein, among the first and the second inclined faces, inclined faces on a side for increasing the clutch capacity are brought into point contact with each other.

7. A multi-plate clutch system comprising:

an outer clutch member, joined to an input member;

a backing plate, fixed to an output member via a spline connection therebetween;

a plurality of first clutch plates engaged with the outer clutch member so as not to rotate relative to the outer clutch member;

a plurality of second clutch plates arranged alternately with the first clutch plates in an axial direction;

a central spool which is formed separately from the backing plate, wherein the central spool has a first side oriented toward the backing plate and a second side oriented facing away from the backing plate and wherein the second clutch plates are engaged with the central spool so as not to rotate relative to the central spool;

a pressure plate disposed proximate the second side of the central spool and that holds, in the axial direction, the first clutch plates and the second clutch plates in the interstice formed between the pressure plate and the backing plate;

a clutch spring that biases the pressure plate to a side so as to pressure-contact the first clutch plates and the second clutch plates with each other; and a cam mechanism that is provided between the backing plate and the first side of the central spool, wherein the cam mechanism transmits the drive power of the input member from the central spool to the backing plate, and which pushes the pressure plate, with the central spool interposed in between, to a side so as to make the pressure plate move away from the backing plate against the biasing force of the clutch spring when reverse drive power is applied from the output member, wherein the cam mechanism includes a protruding cam and a recessed cam, each of the protruding cam and the recessed cam has a first inclined face and a second inclined face, which are inclined in the same direction with respect to the circumferential direction, and wherein the first inclined face of the protruding cam and the first inclined face of the recessed cam are formed with curved convex surfaces such that during clutch engagement, a convex surface of each of the protruding cams is brought into point contact with a convex surface of a corresponding recessed cam.

8. The multi-plate clutch system according to claim 7, wherein the second inclined face of the protruding cam and the second inclined face of the recessed cam comprise flat surfaces, such that during clutch disengagement, each of the protruding cams is brought into face contact with a corresponding recessed cam.

9. In a powertrain assembly of the type having a driven gear which is an input member and a main shaft which is an output member, the improvement comprising a multi-plate clutch system, interposed between the driven gear and the main shaft, said clutch system comprising:

an outer clutch member which is operatively connected to the driven gear;

a backing plate which is affixed to the main shaft via a spline connection therebetween;

a plurality of first clutch plates attached to the outer clutch member so as to rotate concurrently therewith;

a plurality of second clutch plates arranged alternately with the first clutch plates in an axial direction of the main shaft;

a central spool which is formed separately from the backing plate, wherein the central spool has a first side oriented toward the backing plate and a second side oriented facing away from the backing plate and wherein the second clutch plates are engaged with the central spool so as to rotate concurrently therewith;

a pressure plate disposed proximate the second side of the central spool and that holds, in the axial direction, the first clutch plates and the second clutch plates in an interstice formed between the pressure plate and the backing plate;

a clutch spring that biases the pressure plate to a side so as to pressure-contact the first clutch plates and the second clutch plates with each other; and a cam mechanism that is provided between the backing plate and the central spool, wherein the cam mechanism transmits drive power from the central spool to the backing plate, and which pushes the pressure plate, with the central spool interposed in between, to a side so as to make the pressure plate move away from the backing plate against the biasing force of the clutch spring when reverse drive power is applied from the output member, wherein the cam mechanism includes a protruding cam and a recessed cam each having at least one convex surface, each of the protruding cam and the recessed cam has a first inclined face and a second inclined face, which are inclined in the same direction with respect to a circumferential direction, and when the first and second clutch plates of the clutch system are engaged with one another, a convex surface of the protruding cam is configured to be brought into point contact with a convex surface of the recessed cam.

10. The multi-plate clutch system of claim 9, wherein when the first and second clutch plates of the clutch system are disengaged with one another, the protruding cam is configured to be brought into point contact with the recessed cam.

11. The multi-plate clutch system of claim 9, wherein when the first and second clutch plates of the clutch system are disengaged with one another, the protruding cam is configured to be brought into face contact with the recessed cam.

12. The multi-plate clutch system according to claim 1, wherein the central spool comprises an inner cylinder and an outer cylinder coaxial with and spaced away from said inner cylinder;

wherein one of said protruding cam and said recessed cam is integrally attached to said central spool in an area thereof between said inner and outer cylinders, and wherein the other of said protruding cam and said recessed cam is operatively attached to said backing plate.

13. The multi-plate clutch system according to claim 1, wherein the backing plate has a plurality of spaced apart fitting holes formed therein, wherein the central spool has a plurality of recessed cams integrally formed thereon, and wherein each of the projecting cams has a fitting protruding portion which fits into a fitting hole of the backing plate.

14. The multi-plate clutch system according to claim 7, wherein the central spool comprises an inner cylinder and an outer cylinder coaxial with and spaced away from said inner cylinder;

wherein one of said protruding cam and said recessed cam is integrally attached to said central spool in an area thereof between said inner and outer cylinders, and wherein the other of said protruding cam and said recessed cam is operatively attached to said backing plate.

15. The multi-plate clutch system according to claim 7, wherein the backing plate has a plurality of spaced apart fitting holes formed therein, wherein the central spool has a plurality of recessed cams integrally formed thereon, and wherein each of the projecting cams has a fitting protruding portion which fits into a fitting hole of the backing plate.

16. The multi-plate clutch system according to claim 9, wherein the central spool comprises an inner cylinder and an outer cylinder coaxial with and spaced away from said inner cylinder;

wherein one of said protruding cam and said recessed cam is integrally attached to said central spool in an area thereof between said inner and outer cylinders, and wherein the other of said protruding cam and said recessed cam is operatively attached to said backing plate.

17. The multi-plate clutch system according to claim 9, wherein the backing plate has a plurality of spaced apart fitting holes formed therein, wherein the central spool has a plurality of recessed cams integrally formed thereon, and wherein each of the projecting cams has a fitting protruding portion which fits into a fitting hole of the backing plate.

18. The multi-plate clutch system according to claim 7,
wherein at least one of the first and the second inclined faces of the protruding cam is formed with a convex curved surface extending in the axial direction, and
wherein at least one of the first and the second inclined faces of the recessed cam is formed with a convex curved surface extending in a radial direction.

19. The multi-plate clutch system according to claim 9,
wherein at least one of the first and the second inclined faces of the protruding cam is formed with a convex curved surface extending in the axial direction, and
wherein at least one of the first and the second inclined faces of the recessed cam is formed with a convex curved surface extending in a radial direction.

20. The multi-plate clutch system according to claim 7, wherein:
a plurality of the recessed cams are formed between the backing plate and the central spool, each of the recessed cams comprises a pair of spaced-apart projections defining a recess therebetween, and
at least an end side, in the radial direction, of each of the recessed cams is open in an area between said spaced-apart projections.

* * * * *